R. N. CHAMBERLAIN.
STORAGE BATTERY.
APPLICATION FILED DEC. 8, 1906.

970,420.

Patented Sept. 13, 1910.

Witnesses:
A. G. Dimond
E. A. Volk

Inventor:
Rufus N. Chamberlain,
By Wilhelm, Parker & Hald,
Attorneys.

UNITED STATES PATENT OFFICE.

RUFUS N. CHAMBERLAIN, OF DEPEW, NEW YORK, ASSIGNOR TO GOULD STORAGE BATTERY COMPANY, OF NEW YORK, N. Y.

STORAGE BATTERY.

970,420.  Specification of Letters Patent.  Patented Sept. 13, 1910.

Application filed December 8, 1906. Serial No. 346,911.

*To all whom it may concern:*

Be it known that I, RUFUS N. CHAMBERLAIN, a citizen of the United States, residing at Depew, in the county of Erie and State of New York, have invented a new and useful Improvement in Storage Batteries, of which the following is a specification.

This invention relates to that class of tray batteries which comprises trays of antimonial lead or sheet lead and battery plates which are separated by insulators.

The objects of the invention are to construct this style of battery in such manner that the battery is efficient and durable in use, that it can be readily assembled or taken apart, and that it can be produced at moderate expense.

Figure 1:
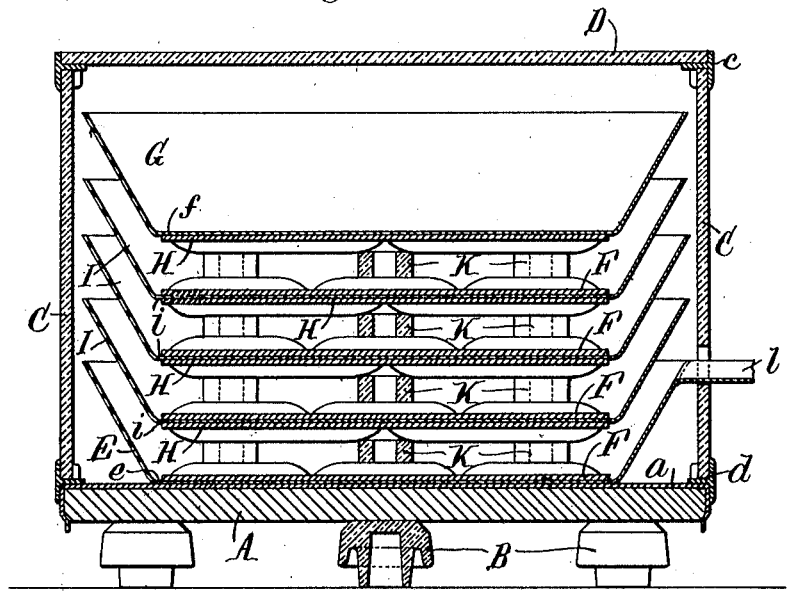
Figure 2:
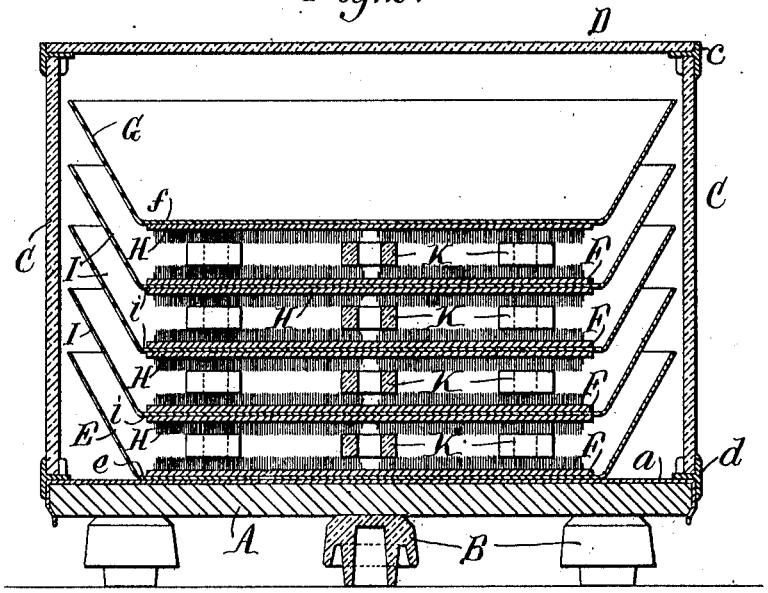

In the accompanying drawings, Figures 1 and 2 are sectional elevations of the battery at right angles to each other.

Like letters and numerals of reference refer to like parts in both figures.

A represents the base plate of the battery case which may be of slate, wood or other suitable material, and provided with a lead covering *a*.

B represents insulators of petticoat or other form upon which the base plate rests.

C represents the upright plates and D the top plate of the casing, preferably of glass. These plates may be connected by upper and lower lead frames *c d*, or other suitable means.

E represents the bottom tray which rests upon the lead covering *a* of the base plate and is provided on the upper side of its bottom *e* with a positive plate or grid F.

G represents the top tray which is provided on the lower side of its bottom *f* with a negative plate or grid H.

I represents the intermediate trays which are each provided with two battery plates or grids, a positive plate F which is arranged upon the bottom *i* of the tray and a negative plate H which is arranged below the bottom. Each battery plate has a ribbed face and a plain back and is applied to the bottom of the tray by the latter. Adjacent negative and positive plates are separated by insulators K of porcelain or other suitable material, five such insulators being preferably arranged between the opposing plates of each pair.

The acid or electrolyte is supplied to the top tray G and overflows from the same into the successive lower intermediate trays I and the bottom tray E. The latter is provided with an overflow *l* through which the excess of acid is discharged and which leads outside of the inclosing case to a suitable receptacle. This overflow prevents the acid from escaping into the lower part of the case or battery compartment.

The trays can be readily stamped from antimonial sheet lead and the positive and negative plates are readily formed in the usual manner and can be tacked to the trays by lead or simply placed in the proper position with reference to the trays in assembling the battery. The negative plates are preferably made of greater capacity than the positive plates and this is readily done because each plate is made separate from the tray. As the battery plates are made separate from the trays the latter can be made of antimonial sheet lead, which has greater acid resisting capacity than pure sheet lead, while when the plates form the bottoms of the trays, as has often been the case, and the raised edge portions of the trays are simply burned to the plates, much more metal must be employed in the combined tray and plates in order to produce a reasonably durable battery. Each member of the battery is comparatively light and the members can be readily assembled in building up a battery or taken apart, when required for making repairs or other purposes. The lead cover of the base protects the latter against acid which may reach it from the trays and the insulators on which the base rests provide for an effective insulation of the base.

The one-sided battery plates can be spun or cast in pairs and then separated.

I claim as my invention:

In a battery, the combination of an inclosing case, superposed metallic trays arranged therein and each having a bottom and raised marginal sides, and battery plates arranged against the upper and under faces respectively of the bottoms of the trays, said trays being nested together, and insulating spacing blocks arranged in each tray and serving as rests for the bottom of the tray next above whereby the bottoms of the trays are maintained in proper spaced relation, and an overflow for the lowermost tray opening out through the wall of the casing.

Witness my hand this 28th day of November, 1906.

RUFUS N. CHAMBERLAIN.

Witnesses:
 EDWARD WILHELM,
 C. B. HORNBECK.